United States Patent

[11] 3,585,305

[72] Inventors Robert E. LaMarche
Atlantic Highlands;
Lloyd Ottesen, Fairhaven, both of, N.J.
[21] Appl. No. 823,118
[22] Filed May 8, 1969
[45] Patented June 15, 1971
[73] Assignee Bell Telephone Laboratories, Incorporated
Murray Hill, N.J.

[54] RANDOM SIGNAL GENERATOR
15 Claims, 4 Drawing Figs.

[52] U.S. Cl. .......... 179/1SA, 328/63
[51] Int. Cl. .......... H03k 5/00
[50] Field of Search .......... 179/1 SA

*Primary Examiner*—William C. Cooper
*Attorneys*—R. J. Guenther and R. B. Ardis

ABSTRACT: A random signal generator that simulates talk-spurt input signals for loading a transmission system utilizing a speech detector is disclosed. The generator converts the output of a wideband noise source into two pulse trains, each of which is synchronized with the time slots of the speech detector utilized by the system under test. One pulse train consists of random fixed duration pulses and the other consists of random pulses whose durations vary randomly.

INVENTORS R. E. LA MARCHE
L. OTTESEN
BY Norman D. McClaskey
ATTORNEY

RANDOM SIGNAL GENERATOR

FIELD OF THE INVENTION

This invention relates to random signal generators and more particularly, to circuitry that generates a plurality of independent random pulse trains, having selected characteristics, that are used in testing certain types of transmission systems.

BACKGROUND OF THE INVENTION

In order to evaluate the performance of certain types of transmission systems, it is necessary to observe their operation when signals generated by large numbers of average human talkers are applied as system inputs. However, since the use of actual human speakers is not always practically feasible, it is desirable to have the capability of simulating the signals generated by average talkers. Such a capability allows system input parameters to be precisely controlled when system operation is being evaluated.

An example of a transmission system requiring test equipment that simulates signals generated by average talkers is a Time Assignment Speech Interpolation (TASI) system. A TASI system allows more efficient use of a transmission system by providing a talker with a channel connection only during intervals when he is active. This method of operation minimizes the amount of time a transmission channel is connected to a talker line on which the talker is not speaking. Consequently, the number of talker lines that may be serviced on a given number of transmission channels is greater for a TASI system than a non-TASI system. The more efficient utilization of the system results in a substantial reduction in the cost of providing the transmission service.

The concept upon which TASI systems are based is that statistically, speech may be considered a series of bursts or spurts. When a talker is active, his speech consists of a series of talkspurts of varying duration representing intelligence. These talkspurts are separated by intervals of silence which contain no intelligence. Therefore, in order to transmit the intelligence, it is only necessary to provide the talker with a channel connection when his talkspurts are present as input signals. During the intervening periods of silence, the channel may be used to transmit talkspurts of other talkers who are active.

In order to simulate talker input signals, or talkspurts, generated by a large number of talkers, it is necessary to apply signals to the TASI system that cause it to operate as though talkspurts, whose times of occurrence and durations are independent, are present as inputs to the system. Since the occurrence and duration of each talkspurt is random, the test signals used to simulate them must also be of a random nature.

PRIOR ART

The random signal generator shown in B. A. McLeod U.S. Pat. No. 2,974,198, issued Mar. 7, 1961, is used to simulate talkspurts. This signal generator was designed for use with a TASI system such as the one disclosed in F. A. Saal et al. U.S. Pat. No. 2,935,569, issued May 3, 1960.

The Saal TASI system has per trunk speech detectors. To exercise this system, the McLeod generator generates a train of signals that randomly activate the input gates of the per trunk speech detectors. In other words, the McLeod generator introduces the simulated talkspurts into the TASI system in the same way that actual talkspurts are introduced into the system. The output of a tone generator is randomly applied to the inputs of the per trunk speech detectors by the random activation of the input gates which connect the tone generator to the speech detector inputs. Variation in talkspurt duration is simulated by varying the duration each input gate remains activated.

SUMMARY OF THE INVENTION

Applicants' generator differs substantially from the McLeod generator. The former applies random fixed duration pulses to a speech detector to simulate the occurrence of a talkspurt and controls the duration of the simulated talkspurt by applying random variable duration pulses to circuitry that controls speech detector hangover. By utilizing two independent random pulse trains, instead of the single tone generator pulse train of the prior art generator, applicants can move accurately simulate talkspurts at a lower cost. While applicants' invention is not limited to use in a system having common time-shared circuitry, it is more readily understood when described in connection with a system utilizing a common time-shared speech detector. Such a common time-shared speech detector is disclosed in C. J. May, Jr., U.S. Pat. No. 3,520,999 issued July 21, 1970.

The May speech detector includes a common time divided store that has a storage location allocated for each of the talker lines and common time-shared circuitry. In operation, the signal level on each talker line is sampled repetitively at a selected rate. All of the talker lines signal levels are sampled on every sampling period. Each time a given talker line is sampled, the store location allocated to it is available and a status code representing the status of the line can be written into the location by code generation logic.

A line may be assigned any one of a number of status codes. For instance, if there is no talker on the line, the status code in the line's allocated storage location is an idle status code I. When a line's status is the idle status, the line is not connected to a channel.

On the other hand, if there is a talker on the line and he is talking, the line's status code will be an active status code. The assignment of the active status results in the line being connected to a transmission channel if one is available.

The remaining possibility is the case where there is a pause in the speech of an active talker. In this case, no signal will be present on the line when it is sampled and the status code in the lines associated storage location is changed to a hangover HO status. When a line's status code is the hangover code HO, the line remains connected to a channel even though the talker on the line is not talking. However, if the talker on the line doesn't resume talking within a selected time, called the hangover, the HO code is replaced with the idle code I and this results in the line being disconnected from the channel.

More concisely, the criteria for determining the connection requirements of the input talker lines are contained in the storage locations of the common time divided store of the speech detector. Consequently, it is possible to control the connection requirements for each line by controlling the status code that is in the store location allocated for the line.

Applicants' signal generator takes advantage of the above-described features of the common time-shared speech detector. Talkspurt occurrence is simulated by generating random pulses of fixed duration. These pulses are synchronized with the sampling time slots and applied to the speech detector status code generator. When one of the random pulses is applied to the code generator during the time slot for a given line, the hangover status code HO is written in the storage location allocated to the line. This simulates the occurrence of a talkspurt on the line.

The generator also generates a second train of independent random pulses of varying duration whose leading and trailing edges are synchronized with the system time slots. These pulses are used to enable the timing circuitry of the time-shared speech detector which controls the length of time the HO status of a line exists. Since the pulses occur randomly and their duration varies in a random manner, the operation of the timing circuitry varies randomly. This mode of operation results in the length of time an HO status code remains in a storage location allocated for a given line varying in a random fashion. The random variation in the duration of the active hangover status, from line to line, simulates the random variation of talkspurt duration. The rate of pulse occurrence may be controlled in both pulse trains and the mean duration of the pulses in the second train may also be controlled.

It is clear that if the system under test has per trunk speech detectors, the invention may still be used by merely providing it with its own timing circuitry. This timing circuitry would be essentially the same kind of timing circuitry to which the variable duration pulses are applied in the May speech detector. The output of this timing circuitry would then be applied to the per truck speech detectors to control the hangover duration.

The invention may be summarized as follows. It is a signal generator that generates two independent trains of random pulses. One pulse train consists of random pulses of fixed duration, synchronized with transmission system time slots, that are connected as inputs to the speech detector signal detection circuitry. The application of these pulses simulates the occurrence of talkspurts by putting the speech detector in a hangover state. The other pulse train consists of random pulses, also synchronized with the transmission system time slots, whose durations vary randomly within limits. The application of these pulses to timing circuitry that controls the duration of the induced hangover state simulates the random variation of talkspurt durations. Applying these two types of pulses simultaneously results in the speech detector operating as it would if a large number of talkspurts were present as inputs. Hence, the transmission system itself will operate as though it is loaded with a large number of talkers.

It is an object of this invention to simulate random real time inputs for use in evaluating transmission system performance.

It is another object of this invention to reduce the cost of simulation equipment required for testing TASI systems.

Another object of the invention is to accurately simulate the speech signals for use in testing TASI systems.

The primary advantages of the invention over the prior art are that it more accurately simulates speech signals at a substantially lower cost.

A more thorough knowledge of the invention, and its various advantages and features will be gained by considering the following detailed description of the drawings.

DETAILED DESCRIPTION

Figure 1:
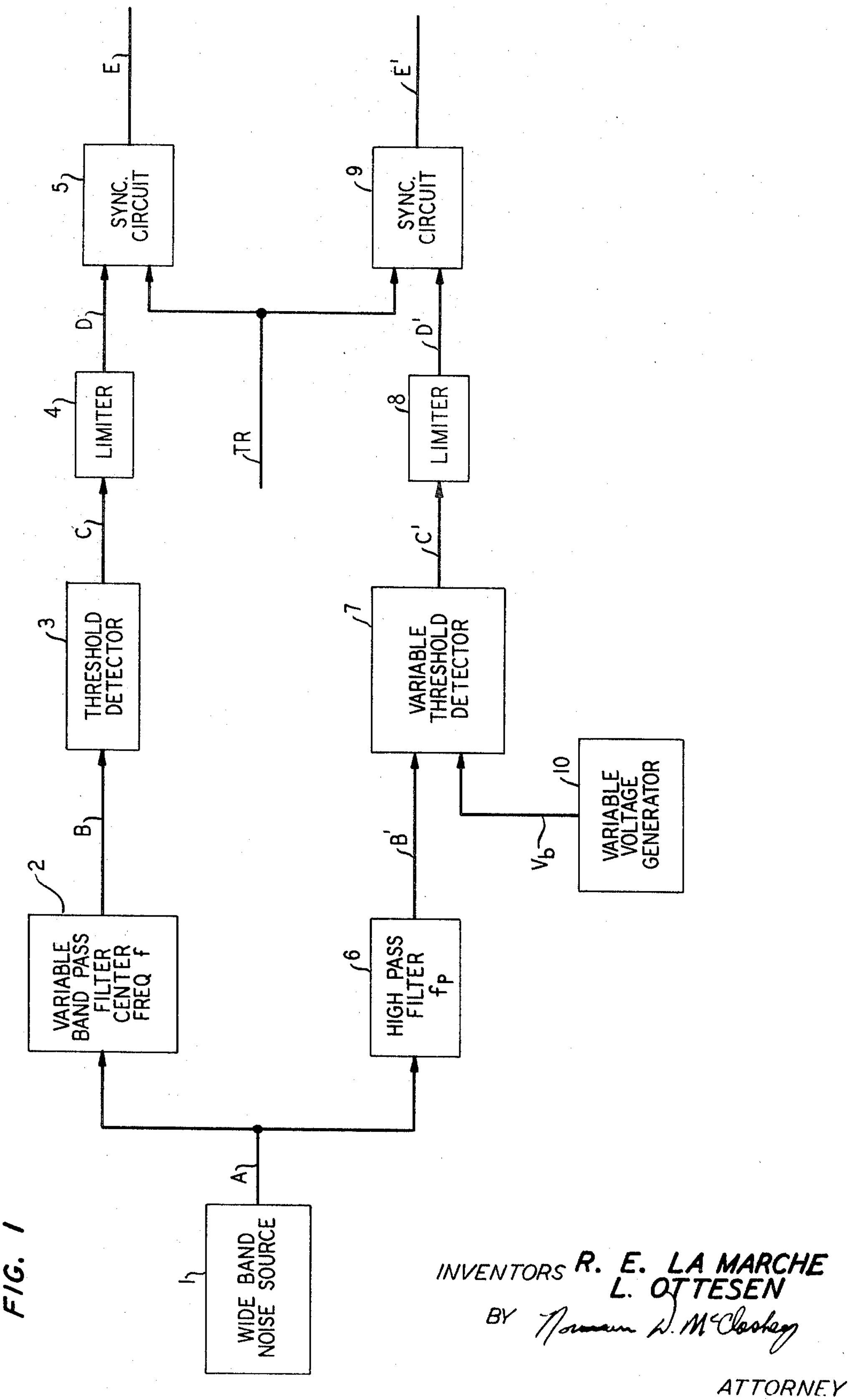
FIG. 1 shows a schematic block diagram of the signal generator.

Referring to FIG. 1, a common noise source is connected to two independent pulse generating circuits. The fixed duration signals representing talkspurt occurrences are felt at point E and the variable duration signals are felt at point E′.

Figure 3:
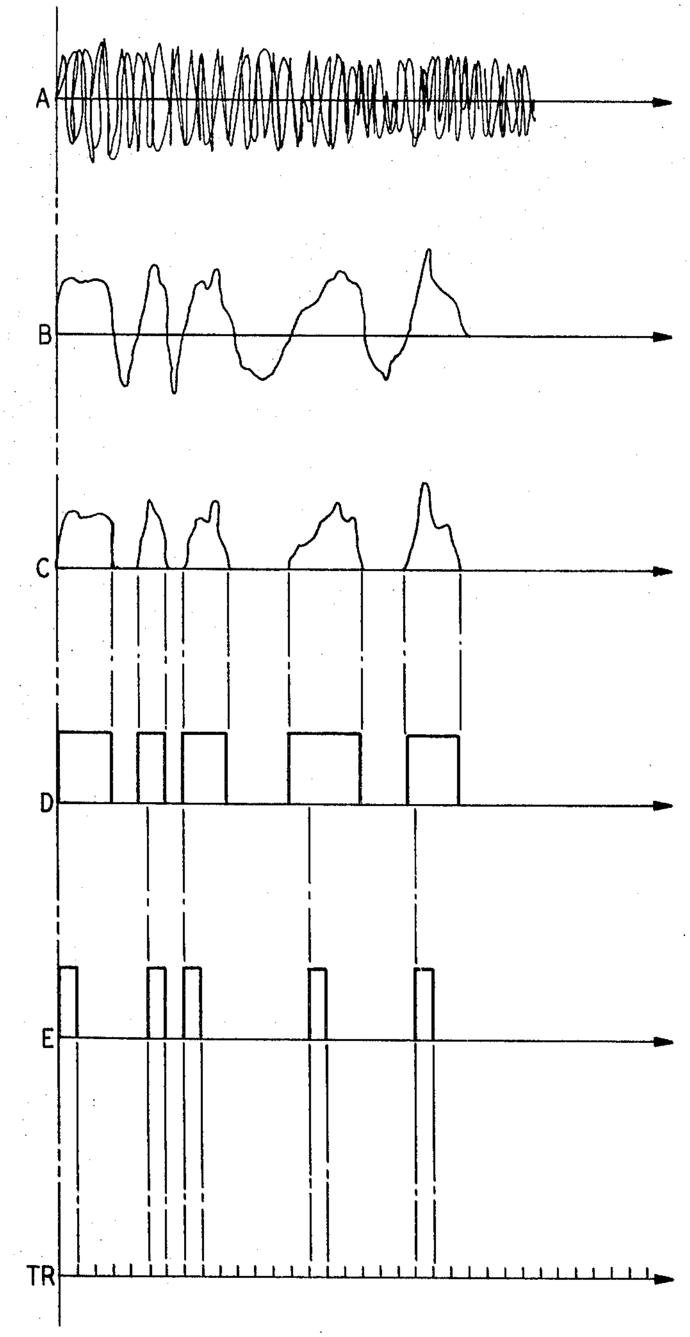
FIGS. 3 and 4 show waveforms at various points in the signal generator which are useful in describing the generator's operation.

The output of the noise source 1 (FIG. 1) is represented by waveform A in FIG. 3. Such an output may be obtained from any one of a number of known noise sources. An example of a source of wideband noise is a thermionic diode.

The output of the noise source 1 (FIG. 1) is connected to a variable band-pass filter 2 with a selected center frequency $f$ which bandlimits the input noise. The output waveform of the band-pass filter 2 is waveform B in FIG. 3. This filter 2 (FIG. 1) is used to control average number of fixed duration pulses that appear at the output E of the generator per second. Since these pulses are used to simulate talkspurt occurrence, varying the rate at which they occur simulates the variation in talkspurt occurrence for real talkers.

The band-pass filter 2 (FIG. 1) output is applied to a threshold detector 3 which produces waveform C in FIG. 3. In essence, the detector 3 passes the portion of its input that exceeds a selected threshold value. The detector output is applied to the limiter 4 which generates the waveform D shown in FIG. 3.

The output of the limiter 4, waveform D (FIG. 3), is applied as an input to a synchronizing circuit 5 (FIG. 1). The synchronizing circuit also has a timing reference signal TR applied as an input. This timing signal is the same timing signal used in generating the sampling time slots for the TASI system under test. The circuit 5 may be any one of numerous known coincidence circuits. When a pulse in waveform D (FIG. 3) and a timing reference signal TR (FIG. 1) are simultaneously present as inputs to the circuit 5, the circuit generates a fixed duration pulse in synchronism with a speech detector time slot. Waveform E in FIG. 3 represents output pulses obtained from the synchronizing circuit 5 during operation.

As will be recalled, the output of the synchronizing circuit 5 (FIG. 1), waveform E (FIG. 3), is applied to a speech detector to simulate talkspurt occurrences. The pulses are applied to the speech detector in a given time slot and result in an active status code being stored in a memory location allocated to the line normally sampled in that time slot.

Returning to FIG. 1, it will be noted that the output of the noise source 1 is also connected to a high pass filter 6. This branch of the signal generator circuitry generates the variable duration pulses that are applied to the speech detector timing circuitry to simulate the variation in talkspurt duration.

The purpose of the high pass filter 6 (FIG. 1) is to limit the duration of the pulses generated. If this is not done, it is possible that all the active status codes written in various memory locations during a given sampling period will be changed to idle status codes during the same sampling period occurring at a later time. In practice, this could only occur if all talkspurts occurring on a given sampling cycle were of the same duration. Since this is not the case in practice, the high pass filter 6 is inserted to eliminate the possibility of it occurring during simulation. The output of the high pass filter 6 is shown in waveform B′ of FIG. 4.

Figure 4:
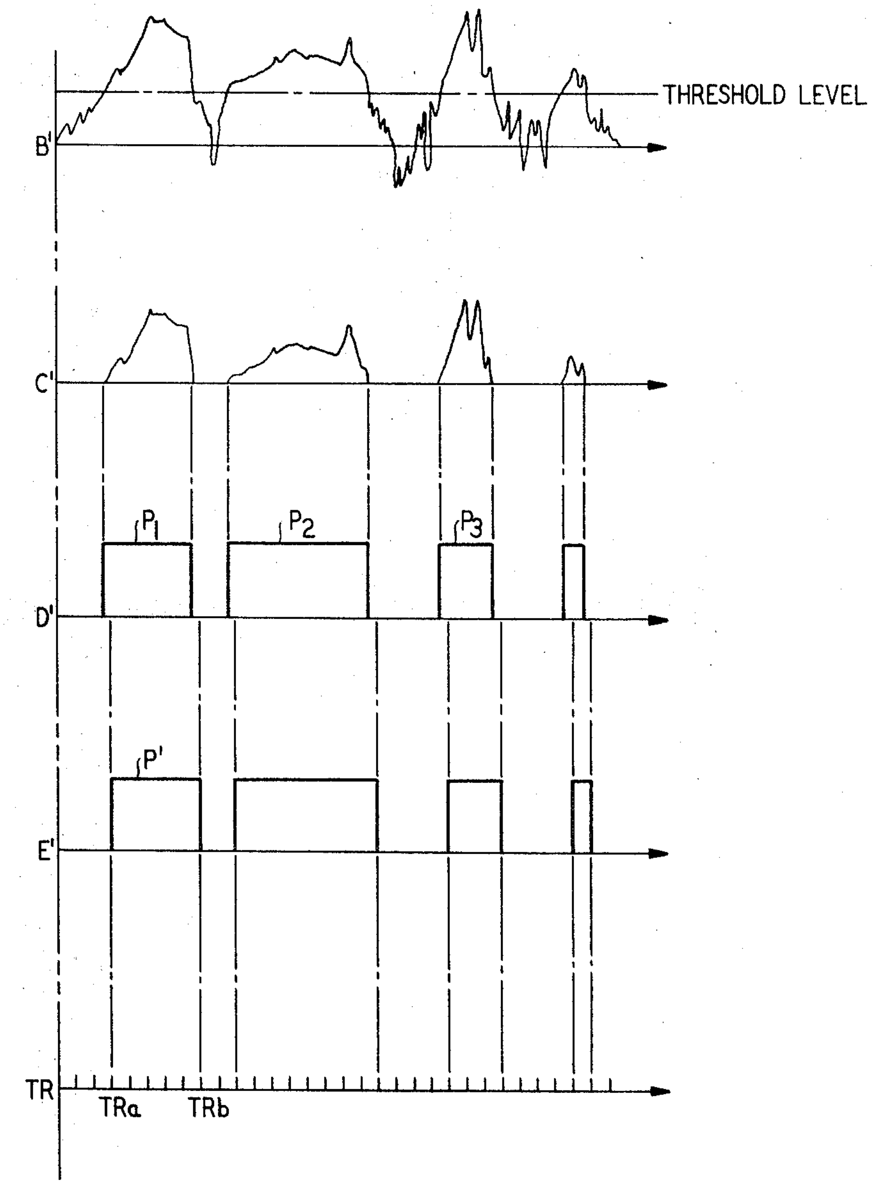

The output of the high pass filter 6 is applied to a variable threshold detector 7. A variable voltage $V_b$ is applied to the detector 7 to vary its threshold. One such threshold is represented by the broken horizontal line as it appears in waveform B′ (FIG. 3). The detector responds to any part of its input that exceeds the threshold by generating a pulse. Waveform C′ (FIG. 4) represents the output of the detector 7. The detector output is applied to the limiter 8 which generates the output waveform D′ (FIG. 4).

The output of the limiter 8 (FIG. 1) is used as one input to the synchronizing circuit 9. The other input is the same timing signal TR that was applied to the synchronizing circuit 5. It will be recalled that the timing signal TR is used in generating the sampling time slots for the system under test.

When an output pulse from the limiter 8 (FIG. 1), such as $P_1$ in waveform D′ (FIG. 4), is present at the same time one of the timing pulses $TR_a$ occurs, the voltage level at the output of the synchronizing circuit 9 increases. The increased voltage level is represented by the leading edge of the pulse P′ in waveform E′ (FIG. 4), the output of the synchronizing circuit 9 remains at this level until the output pulse $P_1$ of the limiter 8 decreases to its reference level. When this occurs, the voltage level at the output of the synchronizing circuit 9 output drops to its original reference value upon the occurrence of the next timing pulse $TR_b$. The drop in voltage level is represented by the trailing edge of the pulse P′ (FIG. 4).

Reference to waveform E′ (FIG. 4) shows the type output pulses obtained from the synchronizing circuit 9 (FIG. 1). These pulses occur randomly since the limiter 8 output pulse required for their generation occur randomly. However, since the generation of the synchronizing circuit 9 output pulses is also dependent upon the TR timing signals, the leading and trailing edges of the pulses are in synchronism with the TASI time slots. Consequently, the output pulses of waveform E′ (FIG. 4) may be characterized as random pulses of random duration, within selected limits, that are synchronized with the TASI time slots. These are the pulses applied to the speech detector timing circuitry to simulate the random variation in the duration of talkspurts.

The foregoing has explained how the signal generator generates two independent trains of random pulses in synchronism with TASI time slots. The train of pulses having a fixed duration are applied to a speech detector code generator to simulate talkspurt occurrence. The other train of pulses, which vary in duration, are applied to the speech detector timing circuitry to simulate the random variation in talkspurt duration.

In order to design the signal generator for use with a specific TASI system it is necessary to determine the desired average frequency of the fixed duration pulses E (FIG. 3) and the average duration of the variable pulses E′ (FIG. 4) in terms of the system's operating parameters. It is assumed that the duty cycle of the fixed duration pulses is equal to the duration of a sampling time slot. Consider a TASI system with a common time-shared speech detector having the following characteristics.

$H$ = total hangover provided by the speech detector;

$N_T$ = total number of possible talkers or talker input lines to be sampled;

$N$ = number of talkers or talker input lines for which an off-hook condition is to be simulated;

$P_a$ = average activity of a talker or a talker input line (i.e., talking time over total conversation or off-hook time);

$S$ = average talkspurt length;

$N_p$ = average number of talkers beginning to speak simultaneously;

$L$ = time required to sample the total number $N_T$ of input lines (i.e., sampling period).

In a TASI system the number of lines $N$ with talkers on them that can be serviced is less than the total number of input lines $N_T$. In other words, the number of talkers that can be satisfactorily served by a TASI system is less than the maximum number of talker input lines. Picking the value $N$ for a particular system is, in essence, picking the system load to be simulated.

Assuming that $N$ is picked to be the maximum number of talkers the system can serve satisfactorily, and further assuming the average talkspurt length $S$ equals the hangover $H$, it will take an average time of $S$ seconds before $N_p$ talkers beginning to speak simultaneously become inactive. In order to maintain equilibrium in a case such as this, $N_p$ talkers must become simultaneously active, on the average, within the S second interval. In other words, if an off-hook condition is being simulated for $N$ talker lines, and the average number of talkers becoming active simultaneously is $N_p$, where the talkers average talkspurt is $S$ seconds in length, an average of $N_p$ new talkspurts must be simulated every $s$ seconds to replace the $N_p$ old talkspurts if the desired loading is to be maintained.

The frequency $f$ of the fixed duration pulses used to simulate talkspurt occurrence that is required to maintain equilibrium may be determined as follows. Assume that $f$xS fixed duration pulses generated every $S$ seconds. Where this number of pulses is greater than $N$, some of the pulses will not be used since a load of only $N$ out of the possible total $N_T$ number of talkers are being simulated. Furthermore, of the $N$ off-hook lines, an average of $N_p$ are always to be active. Therefore, only $N$-$N_p$p/$N$of the fixed duration pulses can be of use in any $S$ second interval. As was pointed out above, the number of pulses required to maintain equilibrium in such an interval in $N_p$. From the foregoing it is possible to write the equilibrium equation;

$$(f)(s)\left(\frac{N-N_p}{N_T}\right)=N_p \quad (1)$$

which may be rewritten as $$f=\frac{N_T}{S}\left(\frac{1}{\frac{N}{N_p}-1}\right) \quad (2)$$

where $N/N_p$ is the reciprocal of the average activity of an input line $P_a$. Thus, the frequency equation may be written in terms of the average talker or input line activity variable as follows:

$$f=\frac{N_T}{S}\left(\frac{P_a}{1-P_a}\right) \quad (3)$$

Equation (3) gives the average rate of fixed duration pulses required to simulate an off-hook condition for $N$lines with an average talker activity $P_a$, where the average talkspurt length $S$ equals the speech detector hangover $H$. This is the average frequency of the pulses that are applied to the status code generator in synchronism with the TASI time slots. It will be recalled that their application results in an active status code being written in the speech detector store location allocated to the line normally sampled in the time slot in which the pulse occurs. In this case, it will be assumed that the hangover status code is written into the appropriate store locations.

Since the duration of talkspurts vary randomly about an average $s_a$ 1 second, the duration the active statuses written into memory remain there must be varied randomly about this value to accurately simulate an input of talkspurts. If the speech detector timing circuitry is operating in its normal manner, the active statuses resulting from the application of the pulse train described by equation (3) will remain in the speech detector store locations for a period equal to the speech detector hangover $H$. This, of course, simulates talkspurts having a fixed duration $H$which is not an accurate simulation of real talkspurts.

In order to simulate the random variation in talkspurt duration, the operation of the timing circuitry, which determines the duration of $H$, must be varied randomly. This mode of operation results in the duration of the HO status codes written in storage on a given sampling cycle being varied randomly and represents an accurate simulation of the variation in talkspurt duration.

As was previously mentioned, control of the speech detector timing circuitry is accomplished by enabling it with the variable duration pulses in waveform E′ (FIG. 4). The operation of the circuitry generating these pulses is based on the following considerations. If the average duty cycle of this circuitry's output is $d$, where $d$ is the time a pulse is on divided by the total time being considered and $d < 1$, then the average time the timing circuitry is enabled during any sampling period is $d$ percent of the sampling period on the average. Since the active statuses HO written into the speech detector store remain there $H$ seconds if the timing circuitry operates normally during sampling periods, it is clear the statuses will remain there longer if the timing circuitry operation is periodically interrupted during these sampling periods. In this case the average time the active statuses remain in the store locations is represented by $H/d$. Choosing this average time to be 1 second, the average talkspurt duration, then $d=H$.

Since the hangover $H$ is known for a given TASI system, $d$ can be ascertained and the variable threshold detector 7 (FIG. 1) can be adjusted so that the average duty cycle of the pulses E′ (FIG. 4) is equal to this value. This is accomplished by adjusting the output $V_b$ of the voltage generator 10 (FIG. 1). When this is done, the simultaneous application of the pulse trains E (FIG. 3) and E′ to the speech detector activity code generator and timing circuitry, respectively results in the speech detector operating as though talkspurts with an average spurt length of 1 second are being applied on the input lines.

Figure 2:
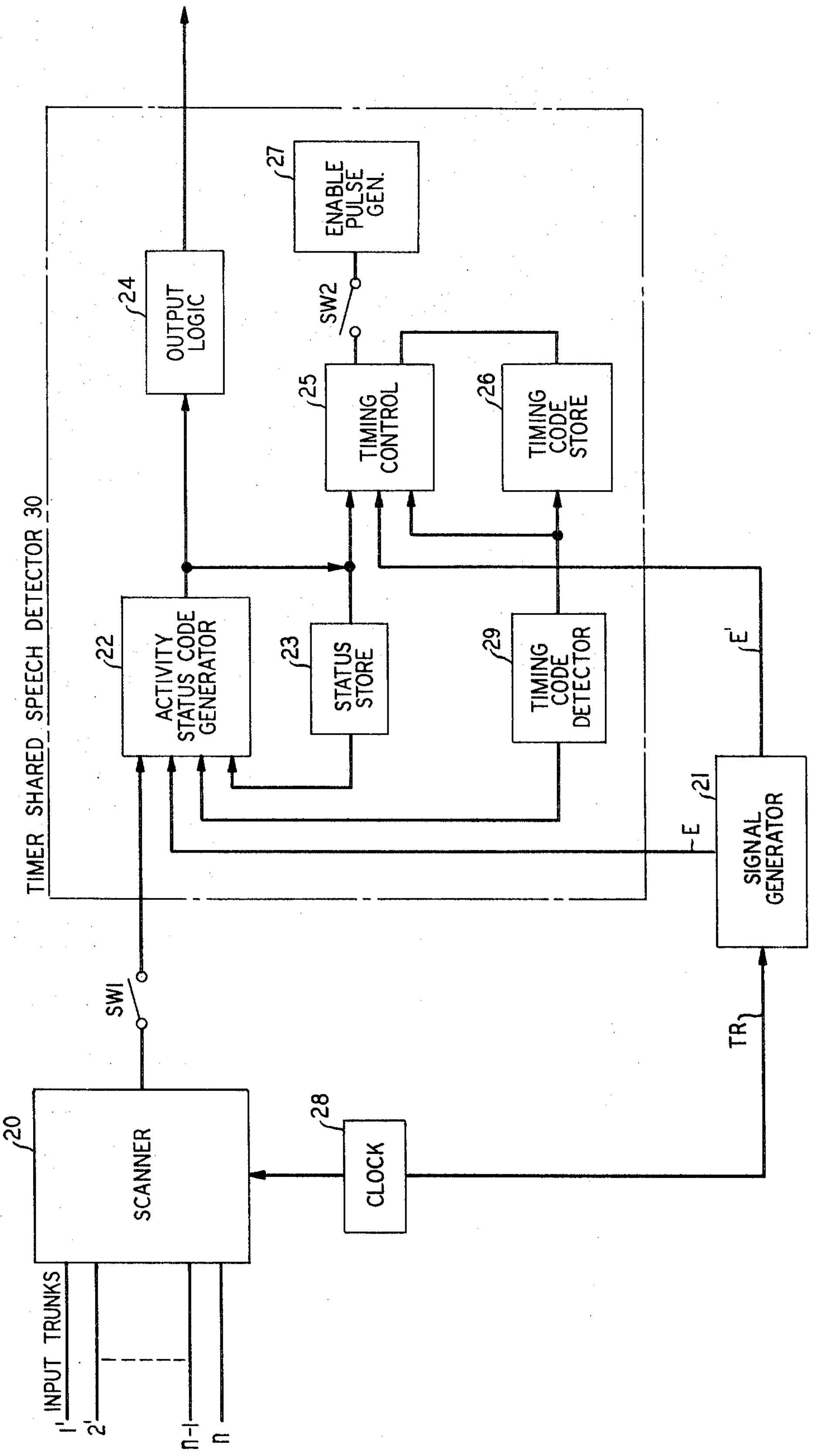
FIG. 2 shows a schematic block diagram of the signal generator interconnected with the speech detector.

Referring to FIG. 2, the signal generator is shown connected to a common time-shared TASI speech detector such as the one disclosed by C. J. May in the above-cited reference. It will be noted that the two switches SW1 and SW2 are open. Opening SW1 insures that no signals will be received via the input trunks 1′ through $n$ which normally carry talker signals. With SW2 open, the pulses that enable the timing circuitry 25 during normal operation are not applied to that circuitry.

The random signal generator 21 (FIG. 2) has one input connection. This input is the timing signal TR used to synchronize the output pulses of the generator with the time slots in which the input trunks are sampled during normal operation. The clock 28 that generates the signal TR operates in synchronism with the rest of the speech detector 30. In other words, a signal TR is generated each time a storage location in the status store 23 and timing store 26 are available. This mode of operation insures that the contents of the storage locations allocated to a given input line are always available in the status store 23 and timing store 26 when that line is sampled. More concisely the clock 28 is used to synchronize the scanning time slots with the time divided stores 23 and 26.

The signal generator 21 (FIG. 2) has two outputs. One output is connected to the speech detector status code generator 22. The random fixed duration pulse output of the generator, shown in waveform E (FIG. 3), is applied to the status code generator 22 over this connection to simulate the occurrence of talkspurts on lines 1' through *n*. The other output of the signal generator 21 is applied to the speech detector timing control circuitry 25. The random variable duration pulses, shown in waveform E' (FIG. 4), are applied to the timing circuitry over this connection to simulate the random variation in talkspurts normally present on the speech detector input lines.

For purposes of illustration, assume a pulse in the E waveform (FIG. 3) is applied to the status code generator 22 in the time slot during which line 1' is sampled during normal operation. The application of this fixed duration pulse to the status code generator 22 results in the generator responding as though a talkspurt was present on line 1'.

More specifically, the application of the pulse results in the status code generator writing the hangover status code HO in the status store location normally assigned to line 1' (FIG. 2). This particular status store location is available at this time since the locations in the store assigned to input lines become available simultaneously with the sampling of their respective lines.

As will be recalled, the HO status code is an active status code indicating that a talkspurt has occurred on the line associated with the store location containing the code. In this case, the occurrence of a talkspurt on line 1' has been simulated. This mode of operation will be repeated every time a pulse in the pulse train E is applied to the status code generator 22. The line for which the occurrence of a talkspurt is simulated is determined by the time slot in which a pulse is applied to the code generator 22.

As was mentioned previously, the random variation in talkspurt duration is simulated by using the E' pulse output of the signal generator 21 to enable the speech detector timing control circuitry 25 (FIG. 2). When the E pulse is applied to the status code generator 22 in the line 1' time slot and the hangover code HO is written in that line's allocated location in the status store 23, the time store 25 location allocated to line 1' is also available.

At this point the line 1' location in the time store 26 is a reference value assumed to be "0" for purposes of illustration. However, with the HO code in the line 1' location of the status store 23, the contents of the lines timing store location is incremented upon the occurrence of the line's time slot during selected succeeding sample periods by the timing control 25 during normal operation.

This incrementing is normally controlled by the enable pulse generator 27 (FIG. 2) which applies a selected frequency of enable pulses with a duration equal to one sample period to the timing control. The frequency of these enable pulses determines the hangover duration period *H* discussed above. When the contents of the line 1' location in the timing store 26 have been incremented to a selected value, the timing code detector 29 generates a signal that results in the hangover code HO in the line 1' location of the status store being replaced by an idle code. This operation indicates the end of a talkspurt and occurs at the end of the hangover duration *H*. Additionally, all other lines having an HO status will also have their timing codes incremented during this sample period since the enable pulse lasts the entire period.

Clearly, the hangover duration *H* may be varied by varying the frequency or the duration of the enable pulses applied to the timing control 25 (FIG. 2). Consequently, pulses which vary randomly in both frequency and duration, such as the E' pulse output of the signal generator 21, to the timing control 25 results in the hangover duration *H* associated with each line varying. For example, assume that during normal operation, the contents of the timing store location assigned to line 1' is incremented by enabling the timing control 25 every other time the line's time slot occurs. The hangover duration *H* for this mode of operation would only be one-fourth the hangover duration obtained by enabling the timing control 25 every eighth time the line's time slot occurred.

Furthermore, by allowing the duration of the enable pulses to vary about some value less than the duration of a sample period, the hangover duration *H* of each of the lines in a set of lines having the status HO assigned to them during the same sample period will vary. Since the timing control is not enabled over a complete sample period, those lines assigned an HO status in the same sample period will have the contents of their respective timing store locations incremented a different number of times in a given number of sample periods. This results in the contents of the timing store locations allocated to the various lines reaching a value indicating the expiration of the hangover duration at different times. As a result, the active HO status assigned to the set of lines will be replaced with the idle status code at varying intervals. In essence, this simulates the speech detector operation for an input of talkspurts with randomly varying durations.

By simultaneously applying the pulses of waveform E (FIG. 3) and waveform E' (FIG. 4) to the activity status code generator 22 and the timing control 25, respectively, speech detector operation is achieved that is very similar to that resulting from the application of actual speech signals on the input lines 1' through *n*. Furthermore, the characteristics of the generated pulses are variable and allow speech detector operation to be evaluated for different types of input loads.

In summary, the invention is an inexpensive means which may be used to accurately simulate speech signals to evaluate the performance of transmission systems.

We claim:

1. In combination;

a wideband noise source;

a timing signal source;

means connected to said noise source source timing signal source for generating fixed duration pulses that occur randomly, shifted in time randomly, the timing signals; and means connected to said noise source and timing signal source for generating pulses with a randomly varying duration that occur randomly, shifted in time for synchronism with said timing signals.

2. In combination:

a wideband noise source;

means connected to said noise source for generating a first set of random pulses;

means connected to said noise source for generating a second set of random pulses;

means responsive to the simultaneous application of said first set of pulses and selected timing signals for generating fixed duration output pulses; and means responsive to the simultaneous application of said second set of pulses and said timing signals for generating variable duration output pulses.

3. A talkspurt simulator comprising;

a wideband noise source;

timing signals;

a variable band-pass filter connected to said noise source for band-limiting the noise output of said noise source, where the center frequency of said variable band-pass filter is related to the total number of possible talkers to be simulated, the average duration of a talkspurt, and the average activity of a talker during a conversation; and means connected to said variable band-pass filter and said timing signals for generating fixed duration pulses occurring randomly, shifted in time for synchronism with said timing signals.

4. The talkspurt simulator of claim 3 further comprising;

means connected to said noise source for generating pulses with a randomly varying duration occurring randomly,, shifted in time for synchronism with said timing signals, where the average duty cycle of pulses is related to the hangover provided by a system to be tested with said simulator.

5. A talkspurt simulator comprising;

a wideband noise source;

timing signals;

a variable band-pass filter connected to said noise source for band-limiting the output noise;

means connected to said variable band-pass filter and timing signals for generating fixed duration pulses that occur randomly, shifted in time for synchronism with said timing signals;

a high pass filter connected to said noise source for band-limiting the output noise;

a variable threshold detector connected to said high pass filter for detecting noise spikes exceeding a selected level; and means connected to said threshold detector and timing signals for generating pulses with a randomly varying duration that occur randomly, band-pass shifted in time for synchronism with said timing signals.

6. The talkspurt simulator of claim 5 wherein the center frequency $f$ of said variable band-pass filter is $$f=\frac{N_T}{S}\left(\frac{P_a}{1-P_a}\right)$$

where $N_T$ = total number of possible talkers;

$P_a$ = average activity of a talker (i.e., total talking time over total conversation time);

$S$ = average talkspurt length.

7. The talkspurt simulator of claim 5 wherein the average duty cycle of said pulses with a randomly varying duration is equal to the hangover provided by a system being tested by said simulator.

8. The talkspurt simulator of claim 5 wherein said timing signals are the timing signals that generate the sampling time slots in a TASI speech detector.

9. In combination;

a wideband noise source;

means connected to said noise source for generating a first set of random signals with unattenuated frequency components constrained to a band of frequencies between two selected bounds;

means connected to said noise source for generating a second set of random signals with unattenuated frequency components above a selected reference frequency;

means responsive to the simultaneous application of said first set of random signals and selected timing signals for generating fixed duration output pulses; and means responsive to the simultaneous application of said second set of random signals and selected timing signals for generating variable duration output pulses.

10. The combination of claim 2 wherein said means connected to said noise source for generating said first set of random pulses further comprises;

means for band-pass filtering the output of said noise source; and means responsive to the band-pass filtered signals for passing only those signals exceeding a selected reference amplitude.

11. The combination of claim 10 wherein said means connected to said noise source for generating said first set of random pulses further comprises;

means responsive to said signals exceeding said reference amplitude for generating said first set of random pulses of uniform amplitude.

12. The combination of claim 2 wherein said means connected to said noise source for generating said second set of random pulses further comprises;

means for high pass filtering the output of the noise source; and means responsive to the high pass filtered signals for passing only those signals exceeding a selected variable reference amplitude.

13. The combination of claim 12 wherein said means connected to said noise source for generating said second set of random pulses further comprises;

means responsive to said signals for generating said second set of random pulses of uniform amplitude.

14. The combination of claim 9 wherein said means responsive to the simultaneous application of said first set of random signals and selected timing signals further comprises;

means which passes only that portion of said first set of random signals exceeding a selected reference amplitude for generating a set of random pulses;

means responsive to said set of random pulses for generating a first set of uniform amplitude, randomly occurring pulses; and means responsive to the simultaneous application of said first set of uniform amplitude, randomly occurring pulses and selected timing signals for generating an output pulse of fixed duration at each simultaneous occurrence of a uniform amplitude, randomly occurring pulse and the initiation of one of the selected timing signals.

15. The combination of claim 9 wherein said means responsive to the simultaneous application of said second set of random signals and selected timing signals further comprises;

means which passes that portion of said second set of random signals exceeding a selected variable reference amplitude for generating a set of random pulses;

means responsive to said set of random pulses for generating a second set of uniform amplitude, randomly occurring pulses; and means responsive to the simultaneous application of said second set of uniform amplitude, randomly occurring pulses and selected timing signals for generating an output pulse beginning at each simultaneous occurrence of a uniform amplitude, randomly occurring pulse and the initiation of one of the selected timing signals, and continuing until the occurrence of the timing signal which first occurs after said randomly occurring pulse ceases.

UNITED STATES PATENT OFFICE
CERTIFICATE OF CORRECTION

Patent No. 3,585,305 Dated June 15, 1971

Inventor(s) Robert E. La Marche and Lloyd Ottesen

It is certified that error appears in the above-identified patent and that said Letters Patent are hereby corrected as shown below:

Column 3, line 10 "truck" should read --trunk--.

Column 5, line 48 "s seconds" should read --S seconds--; line 58 "$\frac{N-N_{pP}}{N}$" should read --$\frac{N-N_p}{N_T}$--;

line 61 "in" should read --is--.

Column 6, line 19 "$S_a$ 1" should read --$S_a \approx 1$--.

Column 8, line 45 delete second "source" and substitute --and--;

line 47 should read --randomly, shifted in time for synchronism with the timing signals;--.

Column 9, line 28 delete "band-pass".

Signed and sealed this 13th day of June 1972.

(SEAL)
Attest:

EDWARD M.FLETCHER, JR.
Attesting Officer

ROBERT GOTTSCHALK
Commissioner of Patents